United States Patent [19]

Rees

[11] Patent Number: 5,053,688

[45] Date of Patent: Oct. 1, 1991

[54] FEEDBACK CIRCUIT FOR ELIMINATING DC OFFSET IN DRIVE CURRENT OF AN AC MOTOR

[75] Inventor: Fenton L. Rees, Rockford, Ill.

[73] Assignee: Sundstrand Corporation, Rockford, Ill.

[21] Appl. No.: 569,580

[22] Filed: Aug. 15, 1990

Related U.S. Application Data

[63] Continuation of Ser. No. 320,224, Mar. 7, 1989, abandoned.

[51] Int. Cl.[5] .......................... H02P 11/00; H02P 6/02
[52] U.S. Cl. ..................................... 318/599; 318/254; 318/138; 318/811
[58] Field of Search ............... 318/138, 254, 293, 439, 318/599, 811

[56] References Cited

U.S. PATENT DOCUMENTS

| | | | |
|---|---|---|---|
| 3,260,912 | 7/1966 | Gregory | 318/599 X |
| 3,427,520 | 2/1969 | Oppedahl | 318/18 |
| 3,431,479 | 3/1969 | Joslyn | 318/257 |
| 3,743,911 | 7/1973 | Erler | 318/629 X |
| 3,743,912 | 7/1973 | Mashimo | 318/599 |
| 3,947,738 | 3/1976 | Oliver | 318/599 X |
| 3,989,992 | 11/1976 | Schmidt | 318/257 |
| 4,020,361 | 4/1977 | Suelzle et al. | 318/599 X |
| 4,251,757 | 2/1981 | Akamatsu | 318/83 |
| 4,507,724 | 3/1926 | Glennon | |
| 4,546,422 | 10/1985 | Okado | |
| 4,567,408 | 1/1986 | Mitsuhashi | 318/599 X |
| 4,597,037 | 6/1986 | Okado | |
| 4,729,082 | 3/1988 | Sato | |
| 4,739,465 | 4/1988 | Asano et al. | |
| 4,780,652 | 10/1988 | Rilly | 318/254 |

OTHER PUBLICATIONS

Publication, "Solid State Control of Ultra High Speed Compressor Motor", Rees et al.

"A New Technology in Energy-Efficient Electrically Driven Aircraft Environmental Control Systems", authored by William W. Cloud, James E. McNamara and David B. Wigmore, appearing as Article No. 869390 of the American Chemical Society, pp. 1696-1702, which also was presented at the IECEC Conference, Aug. 25-26, 1986.

Primary Examiner—Bentsu Ro
Attorney, Agent, or Firm—Antonelli, Terry, Stout & Kraus

[57] ABSTRACT

A motor control (10) for a motor (12) powered by an AC pulse source which applies current pulses to stator windings of the motor to cause rotation of the motor in accordance with the invention includes a current sensor (18) for sensing a DC net current in the current pulses flowing to the stator windings; a pulse width modulator (26-58) for pulse width modulating the current pulses; and wherein the width of the pulses is modulated in response to the sensed net current to reduce the net current towards zero.

18 Claims, 11 Drawing Sheets

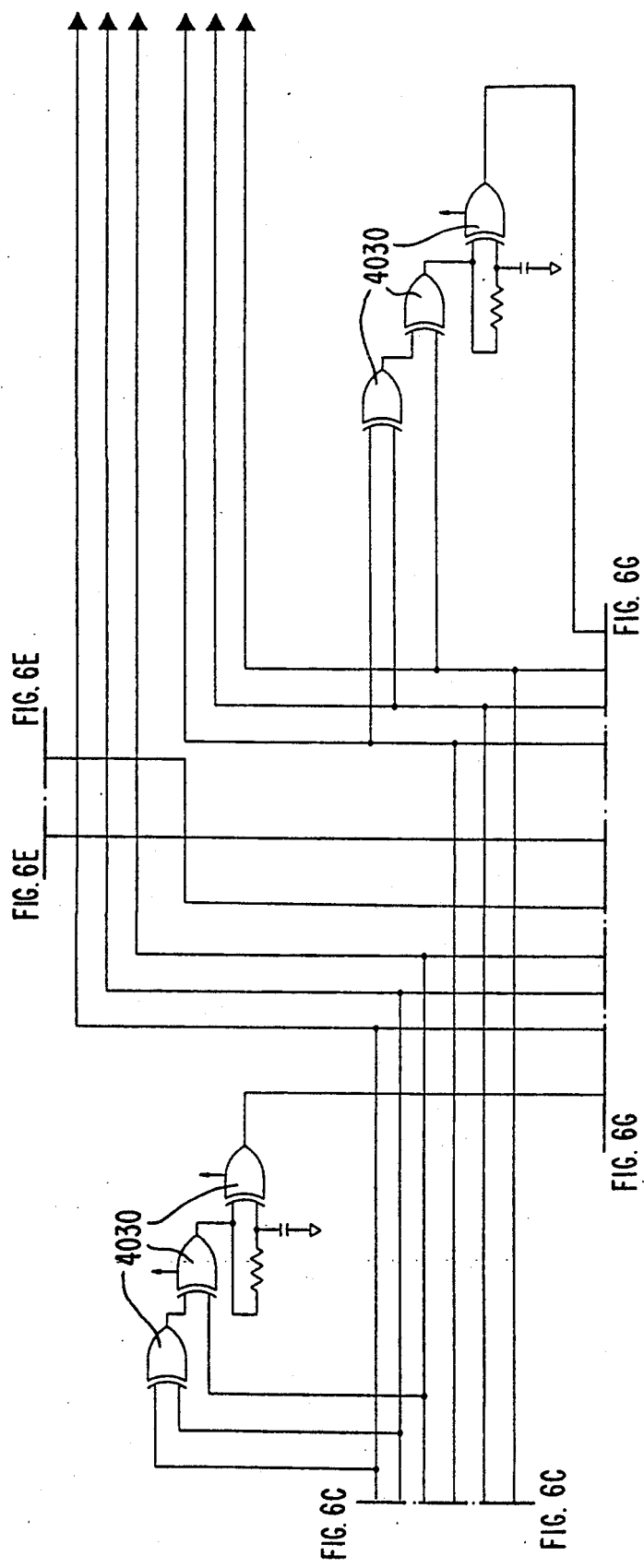

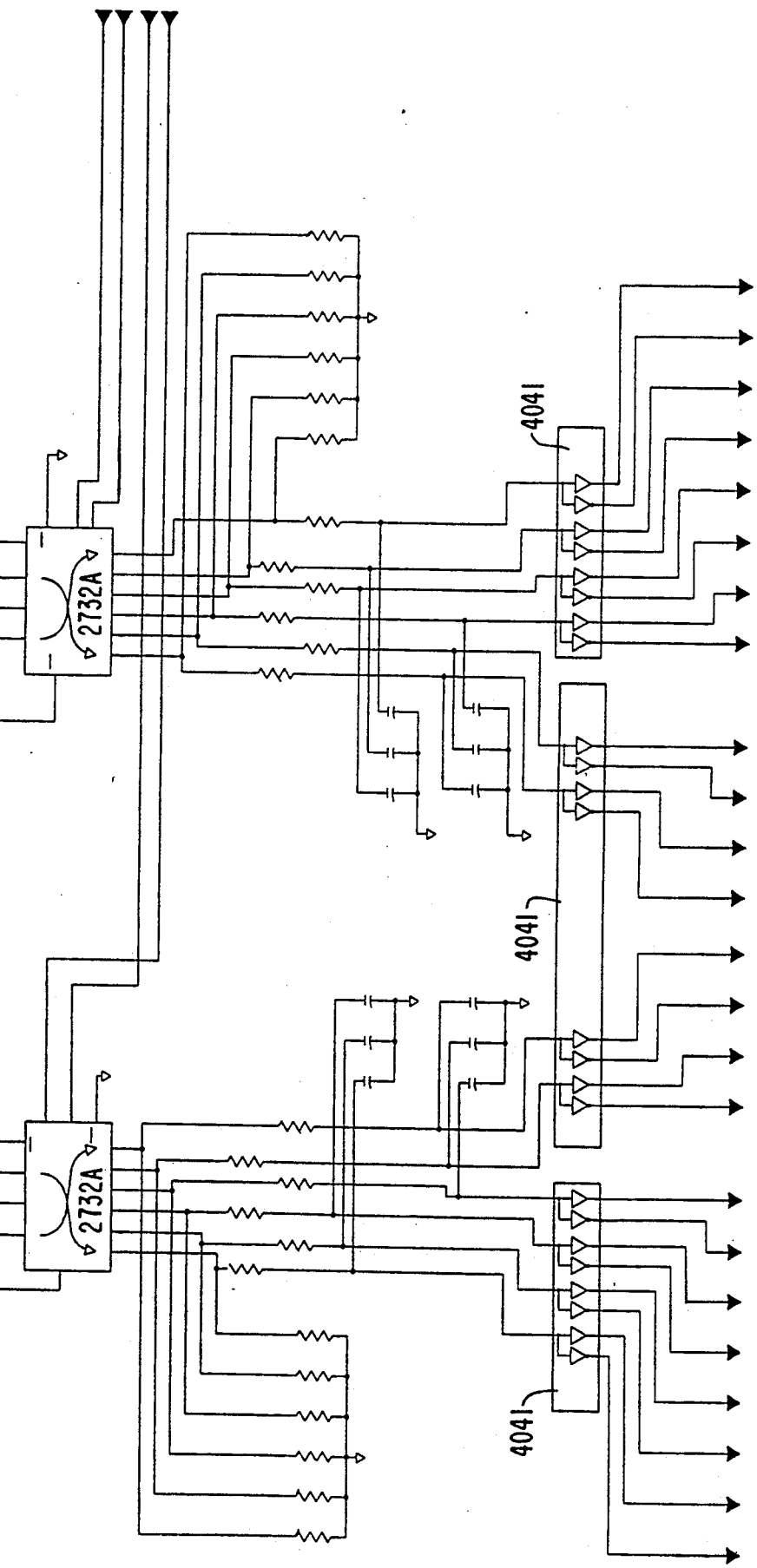

FEEDBACK CIRCUIT FOR ELIMINATING DC OFFSET IN DRIVE CURRENT OF AN AC MOTOR

This application is a continuation of application Ser. No. 07/320,224, filed Mar. 7, 1989, now abandoned.

CROSS REFERENCE TO RELATED APPLICATIONS

Reference is made to the following related applications which are incorporated herein by reference:

(1). "Digital Synchronizing Circuit for Brushless DC Motor", U.S. patent application Ser. No. 319,727, filed on Mar. 7, 1989, now U.S. Pat. No. 4,967,122.

(2). "Variable Speed Variable Torque Brushless DC Motor", U.S. patent application Ser. No. 319,719, filed on Mar. 7, 1989, now U.S. Pat. No. 4,897,583.

1. Technical Field

The present invention relates to motors driven by pulsating alternating current. More particularly, the present invention relates to motors of the foregoing type which are accelerated to high rotational velocities by a pulsating alternating current generated by switching of an inverter.

2. Background Art

FIG. 1 illustrates a typical phase of an inverter which is used in single phase or multiple phase configurations to drive an AC motor. As illustrated, a pair of transistors T1 and T2 are selectively switched on by control signals B1 and B2 applied to the bases. Freewheeling diodes D1 and D2 permit lagging current to bypass the emitter to collector junctions of the transistors T1 and T2. The output voltage V0 which is produced by the switching of transistors T1 and T2 is respectively illustrated on the voltage versus time graphs to the right of the prior art inverter. As is known, there is always a delay between the instant at which a bipolar transistor power switch is commanded to turn off and the time when it ceases to conduct which is a function of the time required to remove minority charge carriers from the base region. This delay in turning off of a bipolar transistor switch requires a delay time as identified by "deadtime" between the instant the first switch T1 is commanded to turn off and the time that its complement T2 is commanded to turn on. If the delay time does not exceed the turn off delay time consequent from the removal of minority charge carriers from the base region of the bipolar transistor switch, both transistor switches will conduct and short out the DC power supply. As a consequence of having to provide "deadtime" between the turning off of the bipolar transistor switch T1 and the turning on of the bipolar transistor switch T2, output voltage V0 of the phase of the inverter driving an AC motor is not controlled by the control circuitry generating the control signals B1 and B2 but instead is controlled by the turn off of the bipolar transistor switches T1 and T2 or the conduction of the freewheeling diodes D1 and D2. As a consequence of the uncontrolled turn off of the bipolar transistor switches T1 and T2 and the diodes D1 and D2, the voltage V0 which is fed to the stator windings connected to the phase which is driven by the inverter also has an indeterminate state. The indeterminate state of the voltage which is fed to the stator windings by the inverter, both during acceleration and steady state operation, may result in positive and negative halves of the current pulses being applied to the stator that are unequal resulting in a net DC offset.

FIG. 2 illustrates the effect of the operation of the prior art inverter in FIG. 1 in driving stator windings of an AC motor. As illustrated, the period of the waveform 360° is broken up into a pair of positive going pulses and a pair of negative going pulses. The pulses are utilized for accelerating the rotor up to a rotational velocity at which the rotor is to be operated and thereafter maintaining that velocity. The pulses are pulse width modulated to control the effective voltage which is applied to the motor windings. As is known, at the time of starting, the back EMF of the motor rises from zero up to a value which establishes the net current being drawn by the motor during operation. The mechanism of pulse width modulation of current pulses applied to the stator windings of the motor is a mechanism for controlling the voltage drawn by the motor during starting and especially during steady state operation to prevent possible damage to the power bipolar transistor switches of the inverter or to the windings of the motor as a consequence of drawing too high of a current. The deleterious effects of the DC offset are cumulative and are especially harmful when the motor is operated over a long period of time. By appropriate pulse width modulation, the effective voltage is controlled and is equal to the integral of the pulses which are positive going and negative going as illustrated in FIG. 2.

The lead and trailing area of each of the pulses which is delineated by the dotted line and labeled "uncontrolled state" represents the portion of the pulse which is not controlled by the control circuitry for generating the control signals B1 and B2 described above with respect to FIG. 1. Because of the characteristics of the power bipolar transistors T1 and T2, the width of the portion of the pulse delineated by the dotted line may vary from pulse to pulse and from positive going pulses and negative going pulses to result in a net DC offset. The result of a net DC offset is excessive motor and inverter losses and possible failure of the bipolar transistor switches T1 and T2 driving each phase of the motor as a consequence of overdriving of the transistors. Thus, if the width of the pulses on the positive going half of the voltage driving the stator is wider than the width of the pulses in the negative going half, a net positive DC voltage will be produced with the effect as described above. Alternatively, if the width of the pulses in the negative going direction is wider than the width of the pulses in the positive going direction, a net negative DC voltage will be produced with the effect described above.

For extremely high speed operation of an AC motor which is driven by a pulsating AC waveform, 30%–40% of the total waveform of the inverter may be an "uncontrolled state" not controlled by the switching signals B1 and B2. Therefore, any net unbalance in the pulsating AC voltage results in a net DC offset which can have particularly deleterious affects during high speed motor operation such as between 30,000–70,000 rpms. This is a consequence of the fact that the net DC voltage caused by the "uncontrolled state" of the transistors T1 and T2 is cumulative which in a circumstance where a motor is being accelerated to a high rotational speed such as 70,000 rpm, the greatest effect is during the latter half of acceleration of the motor up to operating speed and especially during long term operation at the maximum speed. As a practical matter, 8–10 microseconds on the leading and trailing edges of control pulses having a duration of 50–70 microseconds may be an "indeterminate state" as a consequence of the aforementioned uncontrolled output voltage of the inverter caused by the control circuitry's inability to precisely control the turn off of the bipolar power transistors T1 and T2.

Control of switching of inverters with an EPROM having a plurality of address bits is known.

DISCLOSURE OF INVENTION

The present invention provides an electrical motor control for a motor powered by an AC pulse source for driving loads at high rates of speed. With the invention, the net DC current in the AC pulses which are applied to the stator windings of the motor is sensed and the width of the pulses applied to the motor is pulse width modulated by negative feedback to control the width of the pulses such that the net DC current being applied to the stator windings is reduced toward zero. This pulse width modulation control eliminates the problems of the prior art. Specifically, overloading of the bipolar transistor switches of the inverter is prevented as a consequence of reducing the net DC current applied to the inverter windings toward zero which prevents the inverter switches from switching a current over the rated current of the switches as a consequence of the additive effect of DC drift current and the current being switched. Furthermore, undesired electrical losses are prevented by reducing the net current flowing to the stator windings to zero during steady state operation especially at high rotational speeds. Accordingly, the invention provides a motor control which permits the acceleration of a alternating current motor to high rotational speeds by the application of pulse width modulated current pulses applied from an inverter without damage to the bipolar transistor switches of the inverter or undesired electrical losses in the motor or the inverter.

A motor control for an electric motor powered by an AC pulse source which applies current pulses to stator windings of the motor to cause rotation of a rotor in accordance with the invention includes means for sensing a net DC current in the current pulses over a period of time current pulses flowing to the stator windings and producing a negative feedback signal which is a function of the sensed DC current during rotation of the motor; a pulse width modulator, coupled to the current sensor, for varying pulse width modulating the current pulses in response to the negative feedback signal to reduce the net DC current toward zero during rotation of the motor. The current sensor is coupled to an integrator which stores a voltage which is an integral of the current pulses flowing to the stator windings; the pulse width modulator comprises a voltage controlled oscillator coupled to the current sensor having a nominal oscillation frequency in response to a zero net DC current and a variable oscillation frequency which varies as a function of magnitude and sign of the voltage stored by the integrator; and a counter, coupled to the voltage controlled oscillator, for producing pulses having a variable duration with the duration being equal to a time interval during which the counter counts to a predetermined count and; the pulse width modulator is responsive to the pulses produced by the counter to output pulses to the stator windings having a duration proportional to the pulses applied from the counter. The pulse width modulator comprises an inverter having a pair of switches with the switches being alternately switched into conductive states to alternately connect a first potential to the stator windings and a second potential to the stator windings; and a combinational logic circuit, coupled to an output of the counter, for producing control signals respectively applied to control terminals of the switches for respectively controlling conduction of the switches.

The invention further includes a source of a speed control signal of variable frequency with the frequency being proportional to a rotational velocity of the rotor when the motor is operating; a frequency multiplier, coupled to a rotor position sensor, for producing a control signal having a frequency which is multiple of the frequency of the speed control signal, the control signal being coupled to the counter for controlling the frequency of the pulses of variable duration produced by the counter. The frequency of the control signal is variable and is selectable in multiples of the speed control signal. The source of the variable frequency speed control signal comprises a rotor position signal produced by the rotor position sensor in response to rotation of the rotor; a variable frequency voltage source; and means, coupled to the rotor position signal and the variable frequency voltage source, for selectively outputting the speed control signal from the rotor position sensor or the variable frequency voltage source.

The invention further includes an amplifier having an input and an output coupled to the voltage controlled oscillator; a first current path, coupling an output from the current sensor to the input of the amplifier, with a first switch contained in the first current path for controlling the flow of current in the first current path, the first switch having a conductivity controlled by the speed control signal with a first level of the speed control signal causing the first switch to be conductive to permit current to flow in the first current path and the second level of the speed control signal causing the first switch to be non-conductive to block current flow in the first current path; and a second current path, coupling an inverted output from the current sensor to the input of the amplifier, with a second switch contained in the second current path for controlling the flow of current in the second current path, the second switch having a conductivity controlled by the speed control signal with a first level of the speed control signal causing the second switch to be non-conductive to block current flow in the second current path and a second level of the speed control signal causing the second switch to be conductive to permit current to flow in the second current path, the speed control signals cyclically varying between the first and second levels.

The pulse width modulator comprises a source of a speed control signal of variable frequency with the frequency being proportional to a rotational velocity of the motor when the motor is operating; an inverter having a pair of switches associated with each phase of the motor with the switches of each pair of switches being alternatively switched into conductive states to alternatively connect a first potential to the stator windings and a second potential to the stator windings; a memory, coupled to the counter, having a plurality of inputs which function as address bits of storage locations in the memory and a plurality of outputs, a separate pair of the outputs controlling conductivity of each pair of switches of each phase, pulses of the counter being applied to the memory as an address bit; and a signal source, responsive to the speed control signal, producing phase address signals which are applied to the memory. The invention further includes a pulse circuit, responsive to the speed control signal and the pulses produced by the counter for producing a pulse in response to each leading and trailing edge of the speed control signal and pulses from the counter, the pulses from the pulse circuit being applied to the memory as an address bit. A frequency multiplier is coupled to a rotor position sensor for producing a control signal having a frequency which is a multiple of the frequency of the speed control signal, the control signal being coupled to the counter for controlling the frequency of the pulses of variable duration produced by the counter. The frequency of the control signal is variable and is selectable in multiples of the speed control signal. The source of the variable frequency speed control signal comprises the rotor position signal produced by a rotor position sensor in response to rotation of the rotor; a variable frequency voltage source, and means, coupled to the rotor position signal and the variable frequency voltage source, for selectively outputting the speed control signal from the rotor position sensor or the variable frequency voltage source. The invention further includes an amplifier having an input and an output coupled to the voltage controlled oscillator; a first current path, coupling an output from the current sensor to the input of the amplifier, with a first switch contained in the first current path for controlling the flow of current and the first current path, the first switch having a conductivity controlled by the speed control signal with a first level of the speed control signal causing the first switch to be conductive to permit current to flow in the first current path and a second level of the speed control signal causing the first signal to be non-conductive to block current flow in the first current path; and a second current path, coupling an inverted output from the current sensor to the input of the amplifier, with a second switch contained in the second current path for controlling the flow of current in the second current path, the second switch having a conductivity controlled by the speed control signal with a first level of the speed control signal causing the second switch to be non-conductive to block current flow in the second current path, and a second level of the speed control signal causing the second switch to be conductive to permit current to flow in the second current path, the speed control signal cyclically varying between first and second levels.

BRIEF DESCRIPTION OF DRAWINGS

FIGS. 6A-G illustrate a circuit schematic of an embodiment of the invention used with a motor having six phases.

BEST MODE FOR CARRYING OUT THE INVENTION

Figure 1:
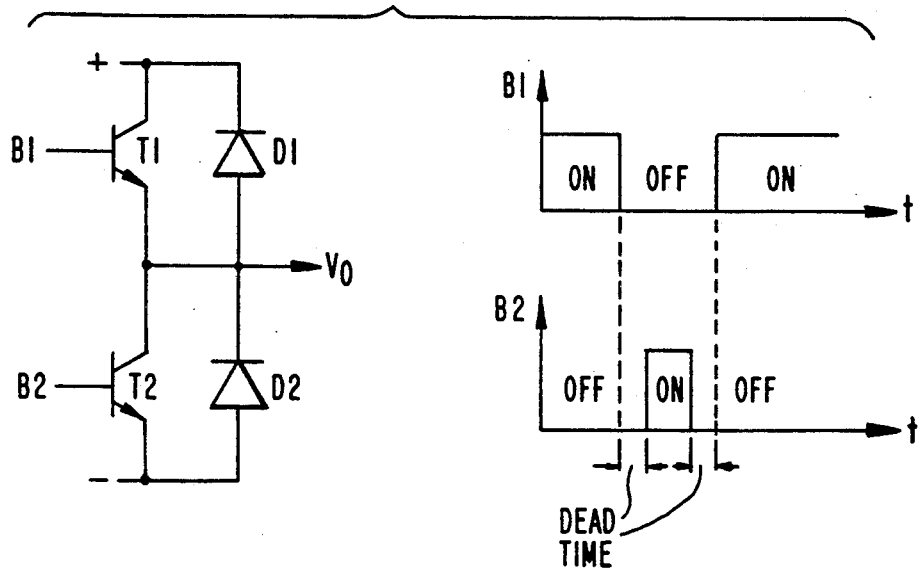
FIG. 1 illustrates a prior art inverter used for driving a motor with a pulsating AC.
Figure 3:
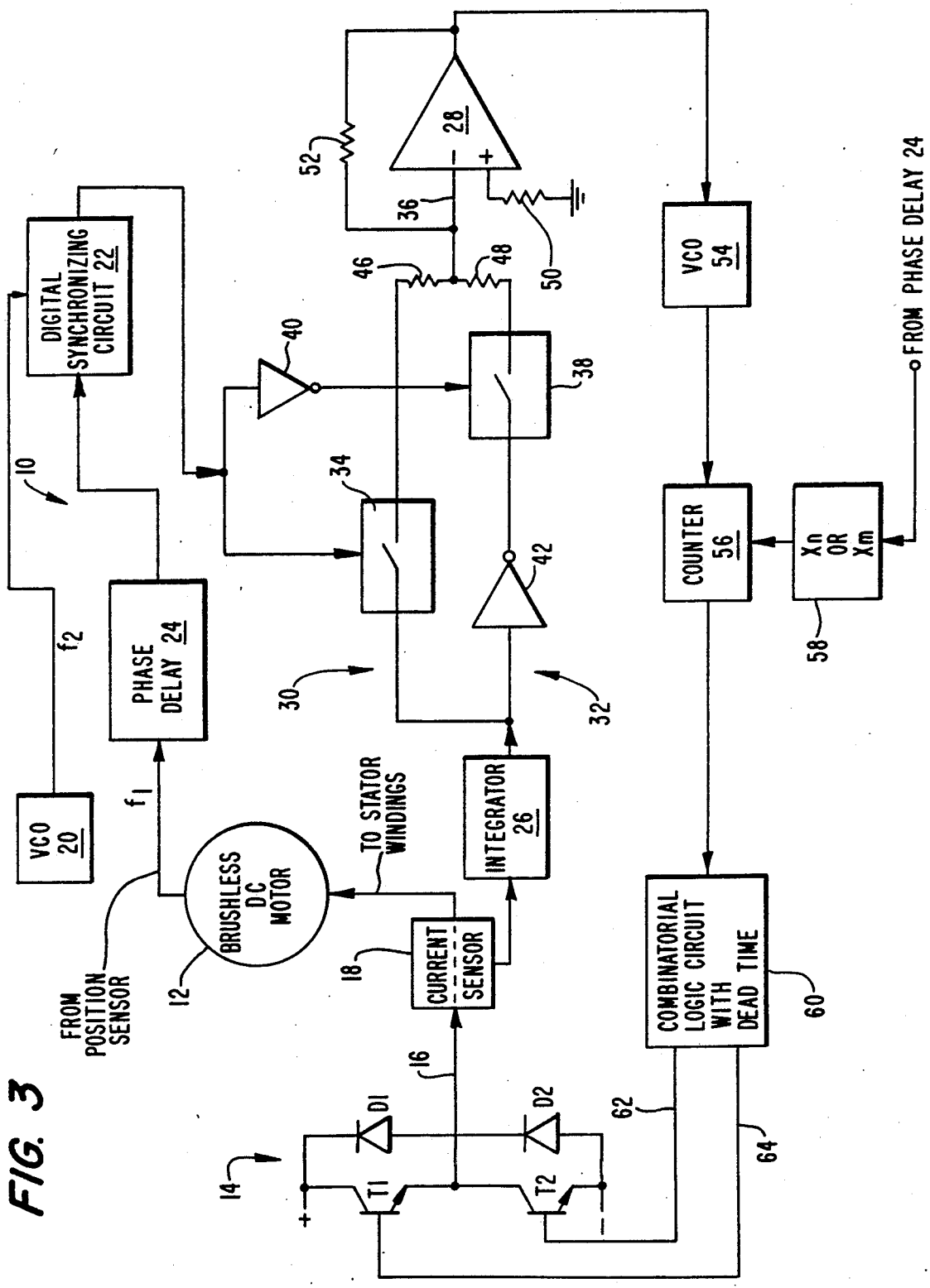
FIG. 3 illustrates a block diagram of a first embodiment of a motor control in accordance with the present invention which drives a single phase AC motor.

FIG. 3 illustrates a first embodiment 10 of the present invention for driving a single phase alternating current motor 12 which may be a brushless DC motor having a permanent magnet rotor with an inverter 14 in accordance with the prior art described above in FIG. 1. The embodiment of FIG. 1 is particularly applicable to driving loads at high rotation speeds, such as up to 70,000 rpm, in which conduction of the bipolar transistor switches T1 and T2 of the inverter 14 and the freewheeling diodes D1 and D2 does not permit precise control of the positive and negative pulses outputted on output 16 of the inverter (as a result of transistor dead time) which results in a net DC offset being applied to the brushless DC motor 12 without DC regulation in accordance with the present invention as described below. With the invention, the net DC current present on the output 16 in the current pulses applied to the brushless DC motor 12 is sensed and used to generate a negative feedback signal to pulse width modulate the switching intervals of the bipolar power transistors T1 and T2 in a way to reduce the net DC current towards zero. The net DC current outputted by the inverter 14 on output 16 is sensed by a current sensor 18 which may be a Hall effect device. The output of the inverter on line 16 is applied to stator windings in a conventional manner. The position of the rotor of the brushless DC motor 12 is sensed by a position sensor such as position sensors using the Hall effect. The output signal from the position sensor is a square wave having a frequency f1 which varies in direct proportion to the rotational velocity of the rotor of the brushless DC motor 12. Phase delay circuit 24 controls the phase of the signals used for commutating the transistors T1 and T2 when commutation of the inverter switches is controlled by output signal f1. An embodiment of the phase delay is disclosed in the above-referenced patent application Ser. No. 319,719 entitled "Variable Speed Variable Torque Brushless DC Motor" now U.S. Pat. No. 4,897,583. The amount of phase delay is used for controlling the torque generated by the brushless DC motor. It should be understood that the relative position of the poles of the position sensor is advanced with respect to the Hall effect devices to provide a mechanical phase advance to compensate for current lagging effects in the windings of the brushless DC motor 12 consequent from high speed operation. The brushless DC motor is operable in two modes with the first mode having commutation of the inverter bipolar transistor switches T1 and T2 controlled by the output signal f1. Utilization of the output signal f1 is especially useful for applications where the rotor is to be accelerated through one or more rotor resonance points for which maximum torque is required that is achieved by commutation of the bipolar transistor switches T1, T2 by the signal f1. The second mode of operation controls the commutation of the bipolar transistor switches T1 and T2 from an external signal source which is voltage controlled oscillator 20 which outputs a signal of a variable frequency f2 which is utilized for controlling the commutation of the bipolar transistor switches T1 and T2 at rotational velocities above where substantial rotor resonance points are encountered such as 30,000-70,000 rpm. Digital synchronizing circuit 22 controls the outputting of either signal f1 of f2 in accordance with the above-described conditions. An embodiment of the digital synchronizing circuit is disclosed in the above-referenced patent application Ser. No. 319,727 entitled "Digital Synchronizing Circuit Brushless DC Motor", now U.S. Pat. No. 4,967,122. However, it should be understood that other implementations of the digital synchronizing circuit 22 may be utilized in practicing the present invention which permit the selection of the two signal sources f1 or f2 to control motor commutation. The output from the digital synchronizing circuit, which is either signal f1 or f2, is applied to control switching of switches 34 or 38 and is a speed control signal.

Figure 2:
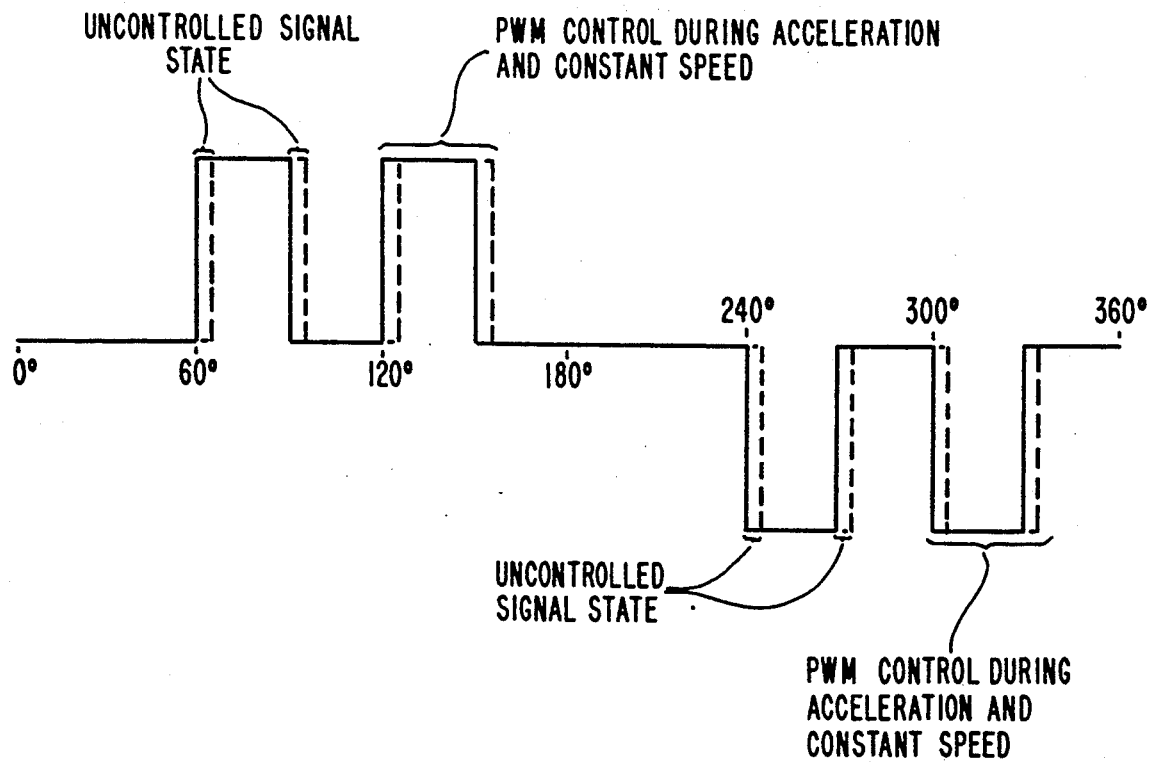
FIG. 2 illustrates a pulse width modulated AC waveform generated by the inverter of FIG. 1 in driving a motor at high speed.

The negative feedback control circuit for pulse width modulating the current pulses produced by the transistors T1 and T2 is described as follows. Integrator 26 produces a voltage equal to the net DC value of the current pulses being applied to the stator windings of the brushless DC motor 12. The integrator 26 stores a positive or negative voltage or no voltage at all depending upon the width of the indeterminate states as identified above by dotted lines in FIG. 2 in the positive going current pulses and the negative going current pulses. Any imbalance in the width in the positive and negative going pulses results in either a positive or a negative net voltage being stored by integrator 26. The output square wave produced by the digital synchronizing circuit 22 is used to control the flow of current flowing to operational amplifier 28 through a first current path 30 and a second current path 32. A first switch 34 controls the flow of current in the first current path 30. When the first switch 34 is nonconductive, the flow of current is blocked and when the first switch is conductive, current is permitted to flow from the integrator 26 to the input 36 of the operational amplifier 28. The flow of current in the second current path 32 is controlled by a second switch 38. When the second switch 38 is nonconductive, the flow of current from the integrator 26 to the input 36 of the operational amplifier 28 is blocked and when the second switch is conductive, current flows in the second current path to the operational amplifier. Inverter 40 is provided to control the conduction of the first switch 34 and the second switch 38 so that only one of the switches is conductive at any point in time. Inverter 42 inverts the polarity of the output signal 26 applied to the input 36 of the operational amplifier 28 during 180° of the cycle of the speed control signal outputted by phase delay 24. The first and second current paths 30 and 32 are necessary to provide the correct polarity in the output of the operational amplifier 28 to control the negative feedback to the bipolar transistor switches T1 and T2 to pulse width modulate the output pulses on output 16 in a manner which reduces the net DC offset towards zero. Resistances 46–52 control the gain of the output signal from the operational amplifier 28. The output signal from the operational amplifier 28 is applied to voltage controlled oscillator 54. Voltage controlled oscillator 54 functions to produce an output signal having a nominal frequency such as 1 MHz when the output signal from the operational amplifier 28 is zero. The output signal from the operational amplifier 28 is applied to a net potential such as 5 volts with the positive or negative going swings of the output signal adding or subtracting from the net 5 volts to modulate the frequency of the output signal from the voltage controlled oscillator 54. The output signal from the voltage controlled oscillator 54 is applied to counter 56 which counts to a predetermined count each time a pulse is received from multiplier 58. The multiplier 58 is synchronized by the positive and negative going swings of the output signal from the phase delay 24 and produces an output signal which is applied to counter 56 which is an integer multiple of the output of the phase delay 24. Preferably, but not limited thereto, the output signal from the multiplier 58 is selectable as either two or four times the frequency of the input signal from the phase delay 24. The output signal from the counter 56 has a frequency equal to the frequency multiple selected from the multiplier 58 with a duration which is pulse width modulated in accordance with the magnitude of the frequency of the input signal from voltage controlled oscillator 54. The pulse width modulated output signal from the counter 56 is applied to a combinational logic circuit with deadtime 60 which produces control signals for controlling the conduction of the bipolar transistor switches T1 and T2 such that the output current pulses produced by the transistors T1 and T2 on output 16 are pulse width modulated in a manner which reduces the net DC current sensed by the current sensor 18 toward zero. The combinational logic circuit with deadtime 60 produces a zero output signal on both of the outputs 62 and 64 during a time interval around the leading and trailing edges of the pulse width modulated output signal from the counter 56 to prevent the possibility of shoot through from the positive potential to the negative potential of the power supply through the bipolar power transistor switches T1 and T2. The interval during which the output 62 and 64 is low around the leading and trailing edges of the output pulse width modulated signal from the counter 56 may be several microseconds (1–10 in the embodiment of FIGS. 6A–G described below) long and produced by a one shot multivibrator or similar circuitry.

The embodiment of FIG. 3 may be implemented to drive brushless DC motors 12 having multiple phases. In an embodiment having multiple phases, a plurality of control circuits in accordance with FIG. 3 are implemented in parallel. Specifically, a separate inverter 14 is provided for each phase of the brushless DC motor 12 and a separate current sensor is provided for sensing the current flowing to the individual stator windings of the brushless DC motor which are driving each of the phases. An integrator 26 is located in each of the outputs from the current sensors 18. A plurality of combinational logic circuits with deadtime 60 equal to the number of phases are provided. Each of the phases contains an integrator 26 current paths 30 and 32, operational amplifier 28, voltage controlled oscillator 54, counter 56 and frequency multiplier 58 as described above. The position sensor of the brushless DC motor and external voltage controlled oscillator 20 is modified to have multiple phase signals. The phase delay 24 required for handling multiple phases may be in accordance with that disclosed in the above-identified patent application Ser. No. 319,719 entitled "Variable Speed Variable Torque Brushless DC Motor".

Figure 4:
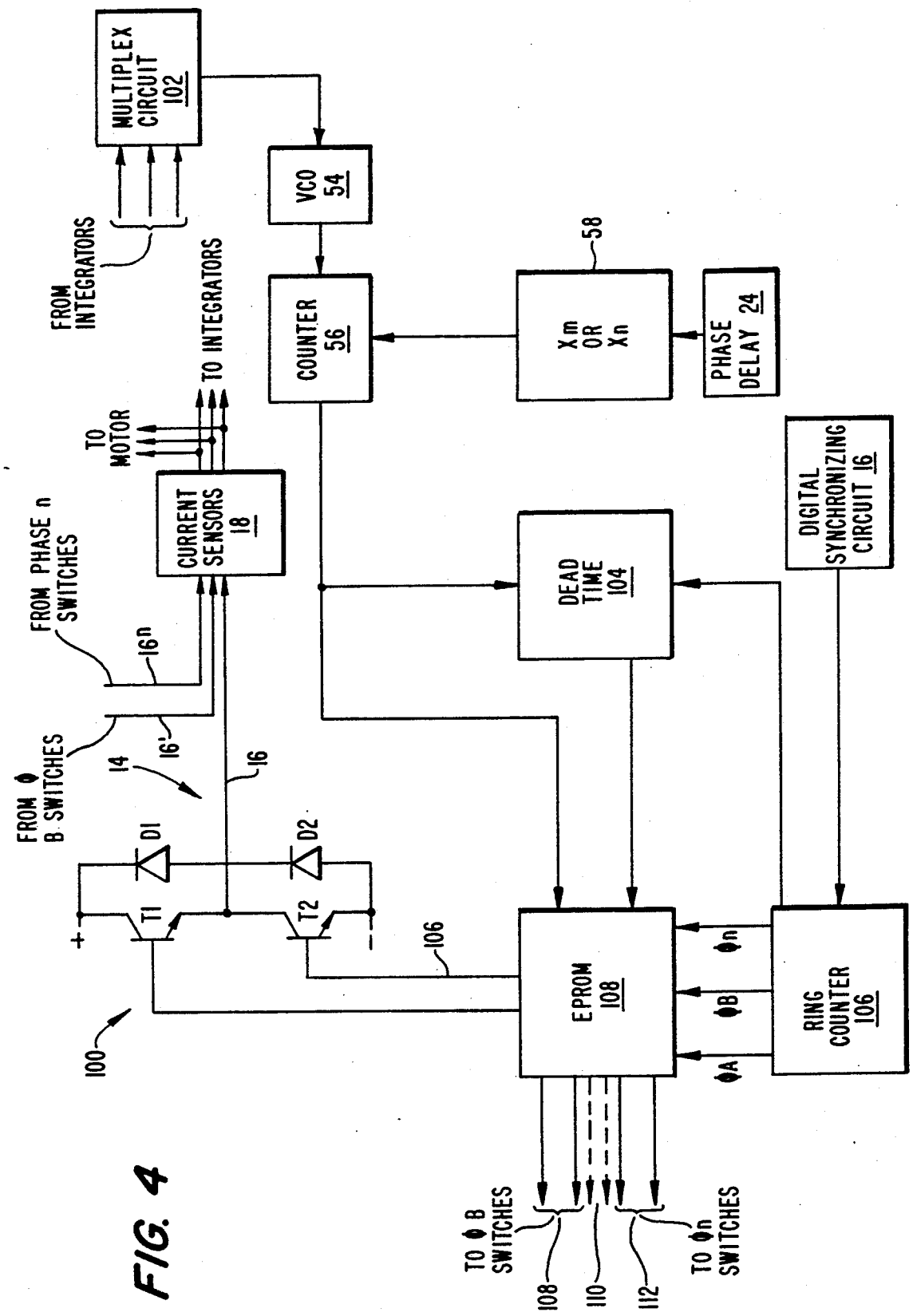
FIG. 4 illustrates a second embodiment of the present invention which drives a multiple phase AC motor.
Figure 5:
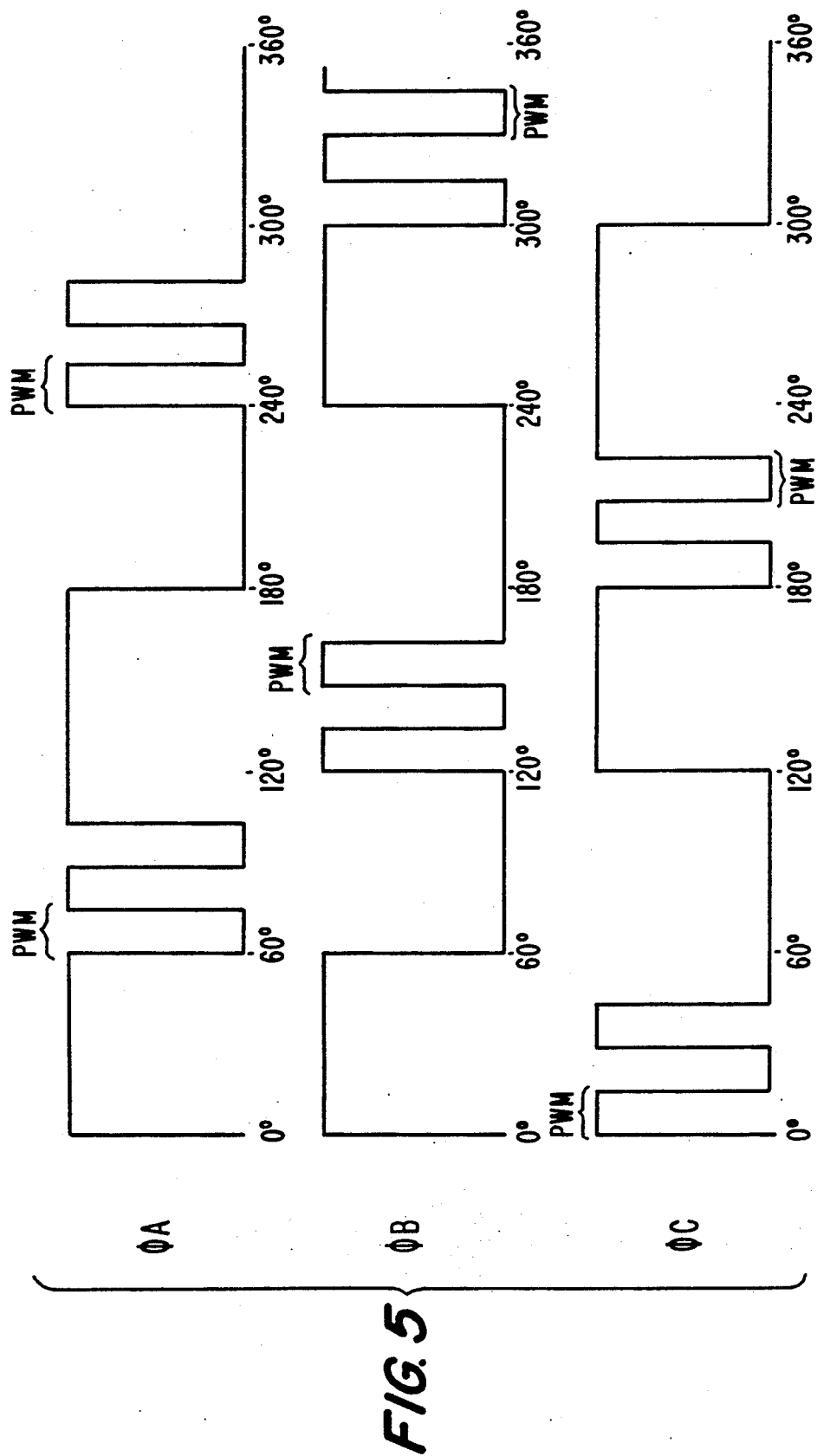
FIG. 5 illustrates the AC waveforms utilized for driving a three phase electrical motor in accordance with the embodiment of FIG. 4.
Figure 6A:
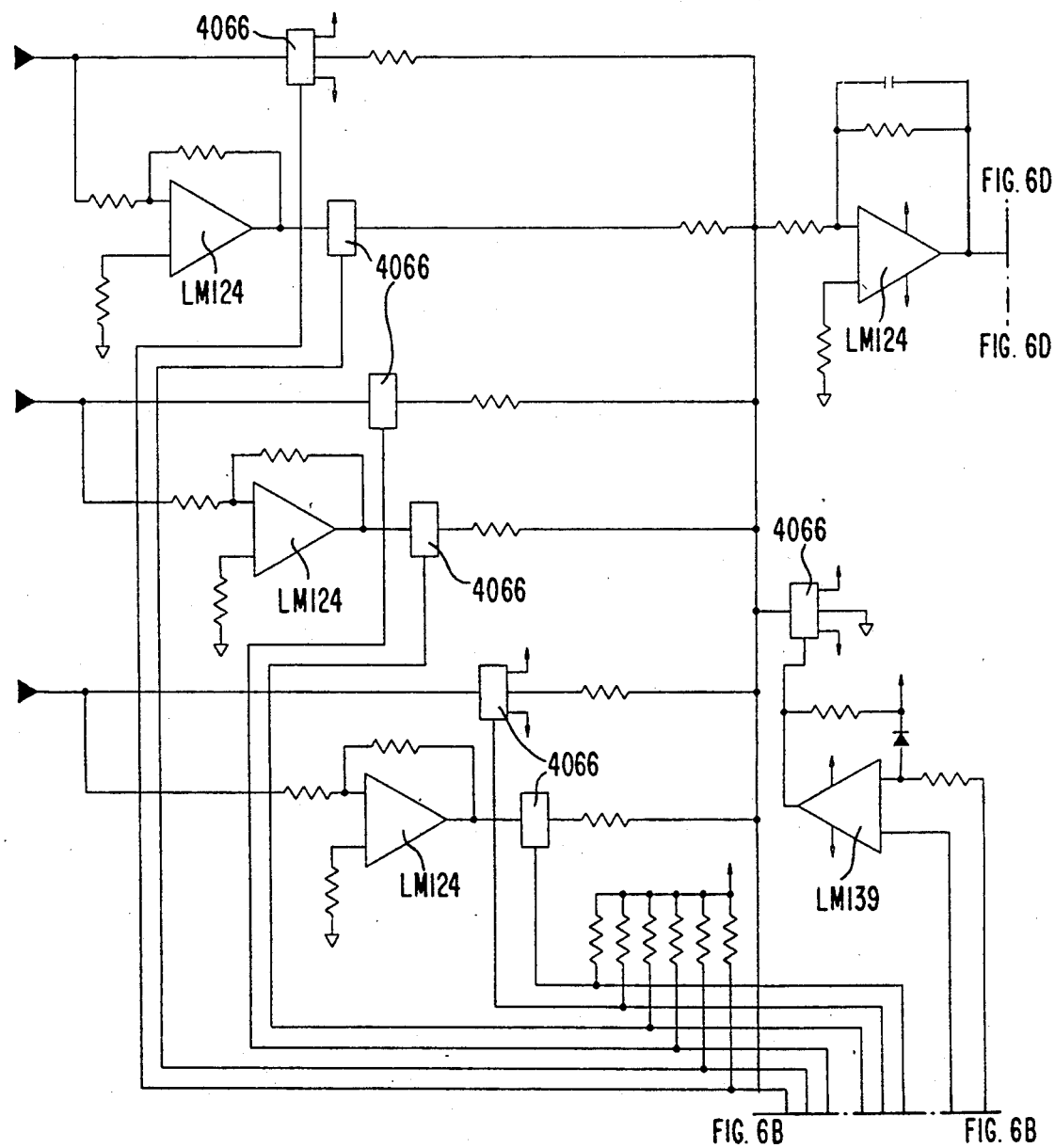
Figure 6B:
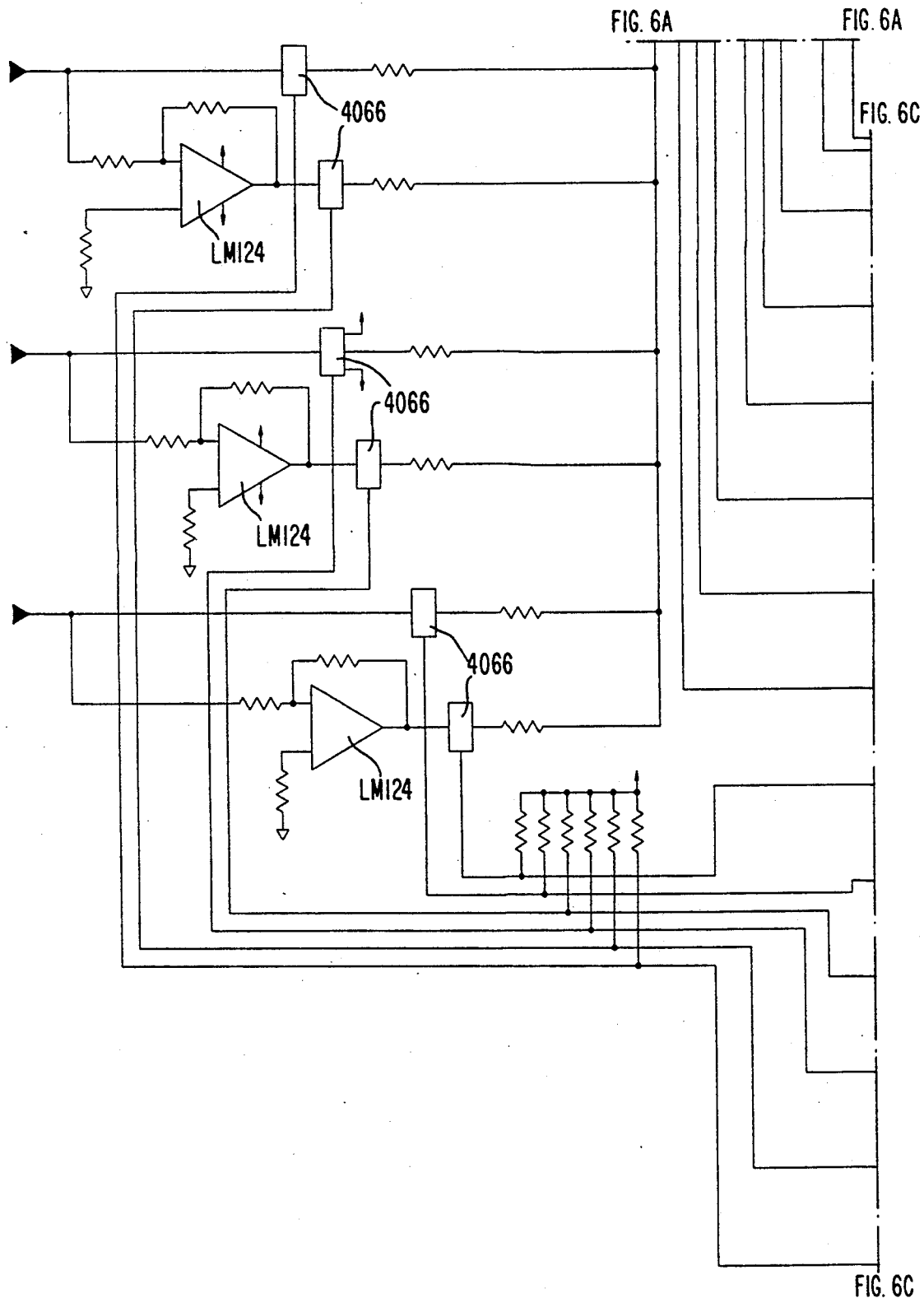
Figure 6C:
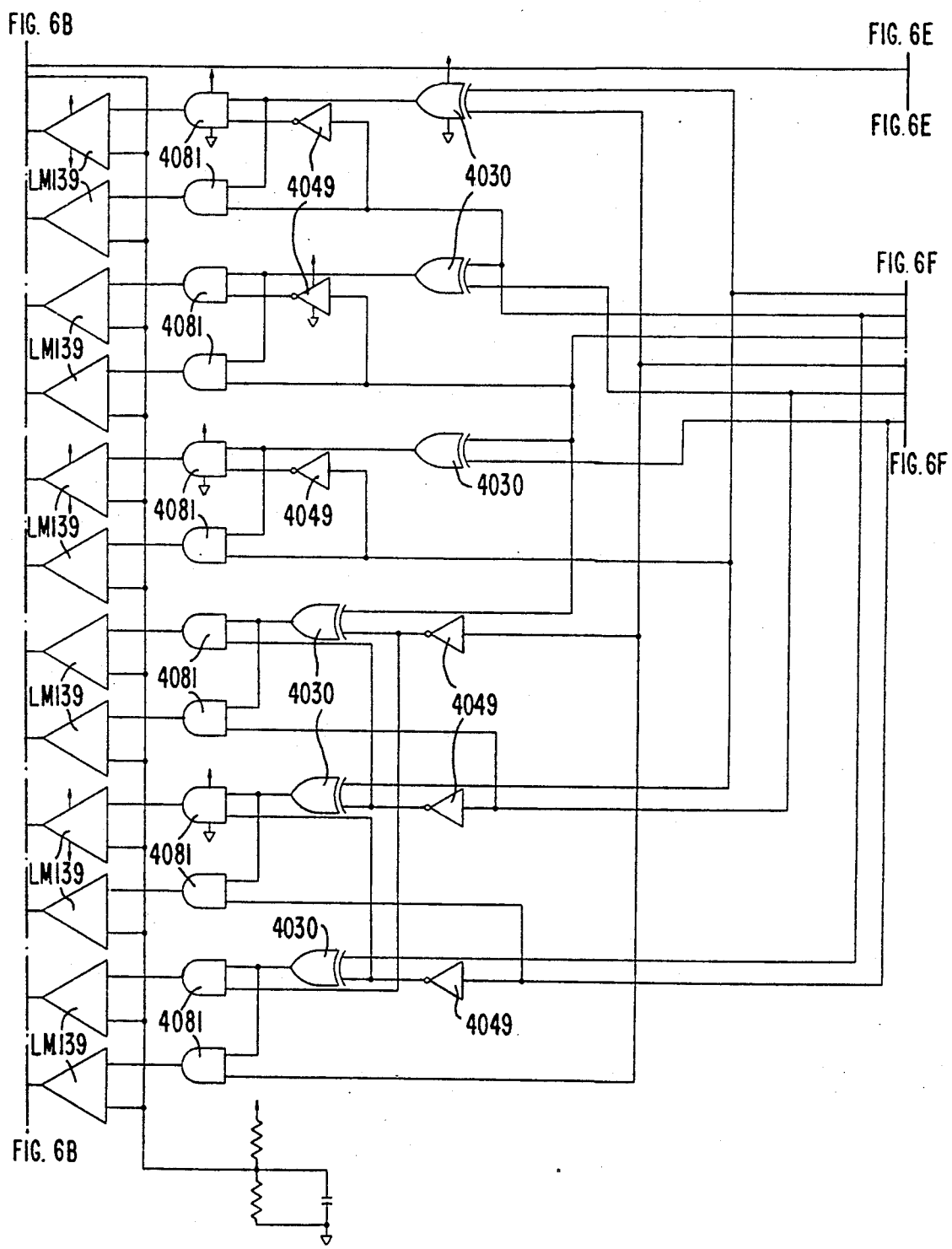
Figure 6D:
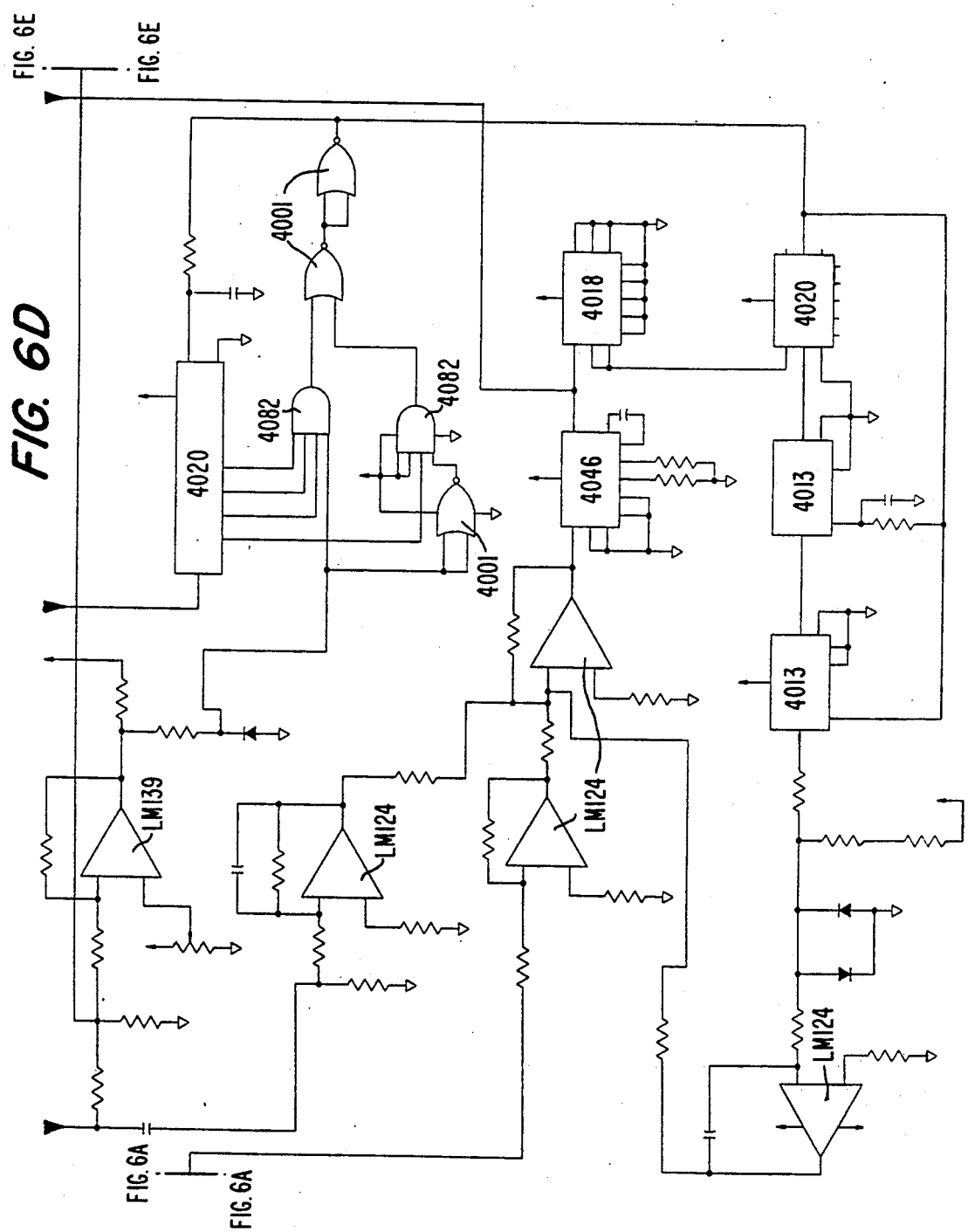
Figure 6E:
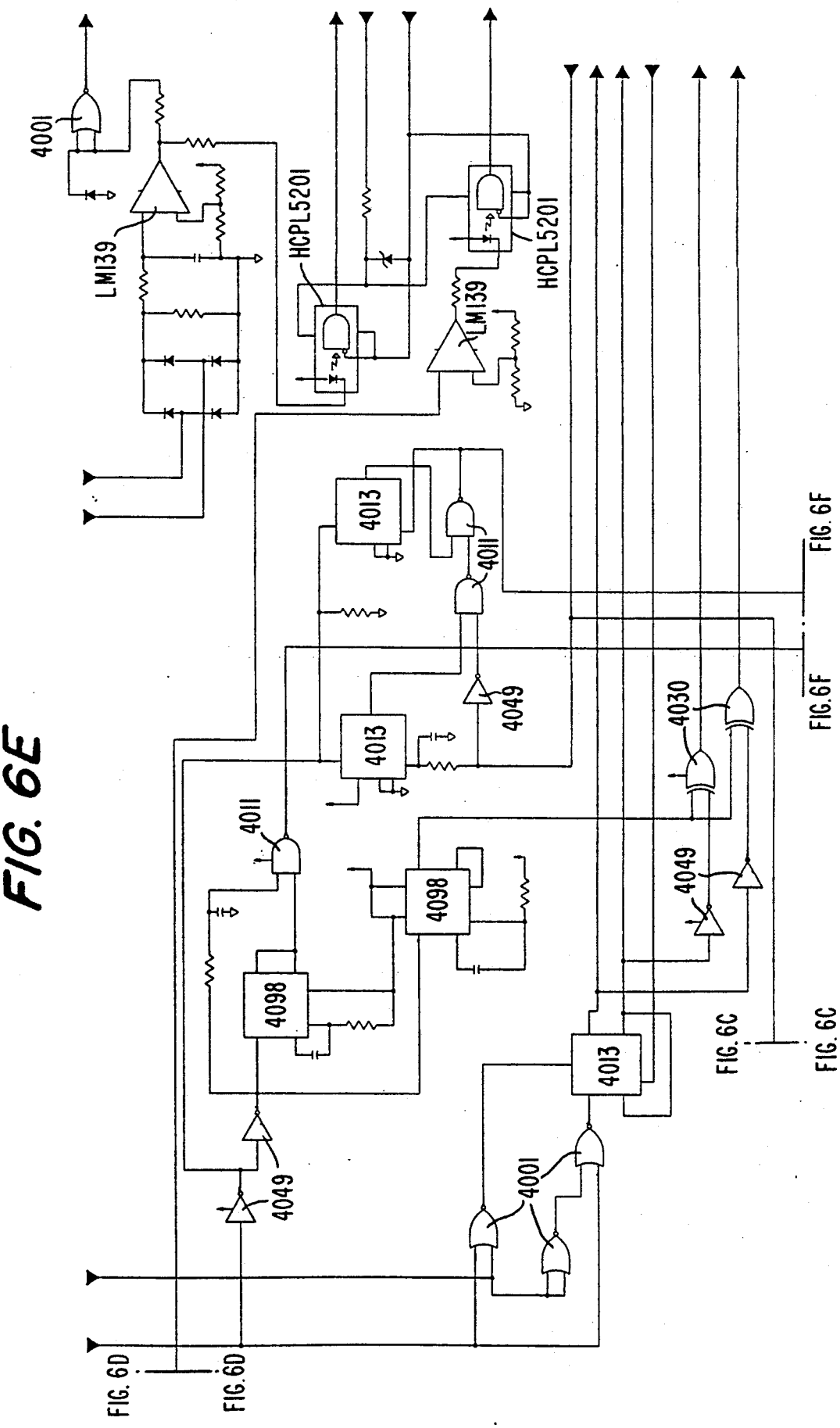

FIG. 4 illustrates a second embodiment 100 of the present invention utilized for driving a multiphase brushless DC motor having n phases. Like reference numerals identify like parts in FIGS. 3 and 4. As illustrated, a total of n phases are contained in the stator of the brushless DC motor (not illustrated). A separate current sensor 18 is provided for each of the outputs 16, 16' and 16 from inverters 14, an inverter for switching phase B and a remaining one or more inverters for switching up to phase n are not illustrated. The outputs from the current sensors 18 are applied to the individual phases of the motor as indicated. Furthermore, the output from the individual current sensors are applied to a plurality of integrators 26 (not illustrated) equal in number to the number of phases. The outputs from the integrators 26 are applied to a multiplex circuit 102 which functions to time multiplex the outputs from the integrators to the voltage controlled oscillator 54. Specifically, as illustrated in FIG. 5 below, when the motor contains three phases, the output from the first phase would be applied to the voltage controlled oscillator 54 in time intervals between 60° and 120° and 240° and 300°; the output from the second integrator 26 would be applied to the voltage controlled oscillator in the interval between 120° and 180° and 300° and 360° and the output from the third phase would be applied to the voltage controlled oscillator in the interval between zero and 60° and 180° and 240°. Counter 56 functions to produce a pulse width modulated output signal in the same manner described above with respect to FIG. 3. The output of the counter 56 is applied to a deadtime circuit 104 which in response to the rising and falling edge of pulses from the ring counter 106 and the counter 56 produces an output pulse of a predetermined duration such as a few microseconds. This output pulse is used for controlling the bipolar transistor switches T1 and T2 of each of the phases to cause both of the transistors to be turned off during the occurrence of a leading and falling edge of the signals from the ring counter 106 and the output from the counter 56 to prevent the possibility of shoot through. The output from the digital synchronizing circuit 24 is applied to a ring counter 106 having a number of output signals equal to the number of phases in the motor. The outputs to transistor switches T1 and T2, "phase B"—phase n" are sequentially outputted at times equally spaced apart during a cycle of the speed control signal applied from the digital synchronizing circuit. EPROM 108 formulates a 5 bit address (when three phases are present) from the output signal from counter 56, deadtime circuit 104 and the phase A, phase B and phase n outputs of the ring counter 106. An additional bit is added for each address. The level of the address inputs from the aforementioned sources determines the output states of the transistors in each of the phases of the inverters 14. Separate addressable portions of the EPROM 108 are allocated to control each of the bipolar power transistor switches and each of the inverters 14 with separate addressable portions being allocated to different control states. The EPROM has a plurality of pairs of outputs 106, 108, 110 and 112, equal to the number of phases in the motor being driven. Signals controlling the conductivity of the bipolar transistor switches T1 and T2 in each of the inverters 14 are outputted on the output lines 106–112 to control the overall conductivity of the inverters 14. The utilization of an EPROM 108 and associated circuitry is advantageous over the use of a combinational logic circuit with deadtime in that more complicated control algorithms may be implemented.

FIG. 5 illustrates the current driving signal applied to a three phase motor in accordance with the embodiment of FIG. 3 having multiple phases or the embodiment of FIG. 4. As illustrated, the fundamental waveform of each of the phases is phase displaced 120° with respect to the other phases. Furthermore, a 60° interval of each of the phases is pulse width modulated to control the effective voltage applied to the stator windings to limit the current drawn by the motor during starting or acceleration. Furthermore, it should be understood that if a higher frequency is selected in the output from multiplier 58, that a multiple of the number of pulse width modulated pulses in each of the phases A-C of FIG. 5 would be provided. For example, in place of two current pulse width modulated pulses, four current pulse width modulated pulses may be utilized.

FIGS. 6A-G illustrate a circuit schematic of an embodiment of the present invention used for a motor having six phases. Integrated circuits and parts are identified by their industry known designation or manufacturer's designation.

While the present invention has been described in terms of its preferred embodiments, it should be understood that numerous modifications may be made thereto without departing from the spirit and scope of the invention. For example, while the invention is preferably utilized with multiple phase motors, the invention may be applied to single phase motors. It is intended that all such modifications fall within the appended claims.

I claim:

1. A motor control for an electric motor powered by an AC pulse source which applies current pulses to stator windings of the motor to cause rotation of a rotor comprising:
   means for sensing a net DC current in the current pulses over a period of time flowing to the stator windings and producing a negative feedback signal which is a function of the sensed net DC current during rotation of the motor; and
   a pulse width modulator, coupled to the net DC current sensing means varying pulse width modulation of the current pulses in response to the negative feedback signal to reduce the net DC current toward zero during rotation of the motor.

2. A motor control in accordance with claim 1 wherein the means for sensing a net DC current comprises:
   a current sensor coupled to an integrator which stores a voltage which is an integral of the current pulses flowing to the stator windings;
   the pulse width modulator comprises a voltage controlled oscillator coupled to the current sensor having a nominal oscillation frequency in response to a zero net current and a variable oscillation frequency which varies as a function of magnitude and sign of the voltage stored by the integrator, and a counter, coupled to the voltage controlled oscillator, for producing pulses having a variable duration with the duration being equal to a time interval during which the counter counts to a predetermined count; and
   the pulse width modulator is responsive to the pulses produced by the counter to output pulses to the stator windings having a duration proportional to the pulses applied from the counter.

3. A motor control in accordance with claim 2 wherein the pulse width modulator comprises:
   an inverter having a pair of switches with the switches being alternately switched into conductive states to alternatively connect a first potential to the stator windings and a second potential to the stator windings; and
   a combinational logic circuit, coupled to an output of the counter, for producing control signals respectively applied to control terminals of the switches for respectively controlling conduction of the switches.

4. A motor control in accordance with claim 3 further comprising:
   a source of a speed control signal of variable frequency with the frequency being proportional to a rotational velocity of the motor when the motor is operating; and a frequency multiplier, coupled to a rotor position sensor, for producing a control signal having a frequency which is a multiple of the frequency of the speed control signal, the control signal being coupled to the counter for controlling the frequency of the pulses of variable duration produced by the counter.

5. A motor control in accordance with claim 4 wherein:
the frequency of the control signal is variable.

6. A motor control in accordance with claim 5 wherein:
the frequency of the control signal is selectable in multiples of the speed control signal.

7. A motor control in accordance with claim 6 wherein the source of the variable frequency speed control signal comprises:
a rotor position signal produced by the rotor position sensor in response to rotation of the rotor;
a variable frequency voltage source; and
means, coupled to the rotor position sensor and the variable frequency voltage source, for selectively outputting the speed control signal from the rotor position sensor or the variable frequency voltage source.

8. A motor control in accordance with claim 4 further comprising:
an amplifier having an input and an output coupled to the voltage controlled oscillator;
a first current coupling an output from the net DC current sensing means of the amplifier, with a first switch contained in the first current path for controlling the flow of current in the first current path, the first switch having a conductivity controlled by the speed control signal with a first level of the speed control signal causing the first switch to be conductive to permit current to flow in the first current path and a second level of the speed control signal causing the first switch to be non-conductive to block current flow in the first current path; and
a second current path, coupling an inverted output from the net DC current sensing means to the input of the amplifier, with a second switch contained in the second current path for controlling the flow of current in the second current path, the second switch having a conduct controlled by the speed control signal with the level of the speed control signal causing the second switch to be non-conductive to block current flow in the second current path, and the second level of the speed control signal causing the second switch to be conductive to permit current to flow in the second current path, the speed control signal cyclically varying between the first and second levels.

9. A motor control in accordance with claim 7 further comprising:
an amplifier having an input and an output coupled to the voltage controlled oscillator;
a first current path, coupling an output from the net DC current sensing means of the amplifier, with a first switch contained in the first current path for controlling the flow of current in the first current path, the first switch having a conductivity controlled by the speed control signal with a first level of the speed control signal causing the first switch to be conductive to permit current to flow in the first current path and a second level of the speed control signal causing the first switch to be non-conductive to block current flow in the first current path; and
a second current path, coupling an inverted output from the net DC current sensing means to the input of the amplifier, with a second switch contained in the second current path for controlling the flow of current in the second current path, the second switch having a conductivity controlled by the speed control signal with the first level of the speed control signal causing the second switch to be non-conductive to block current flow in the second current path, and the second level of the speed control signal causing the second switch to be conductive to permit current to flow in the second current path, the speed control signal cyclically varying between the first and second levels.

10. A motor control in accordance with claim 2 wherein the pulse width modulator comprises:
a source of a speed control signal of variable frequency with the frequency being proportional to a rotational velocity of the motor when the motor is operating;
an inverter having a pair of switches associated with each phase of the motor with the switches of each pair of switches being alternatively switched into conductive states to alternatively connect a first potential to the stator windings and a second potential to the stator windings;
a memory, coupled to the counter, having a plurality of inputs which function as address bits of storage locations in the memory and a plurality of outputs, a separate pair of the outputs controlling conductivity of each pair of switches of each phase, pulses of the counter being applied to the memory as an address bit; and
a signal source, responsive to a speed control signal having a variable frequency, producing phase address signals which are applied to the memory.

11. A motor control in accordance with claim 10 further comprising:
a pulse circuit, responsive to the speed control signal and the pulses produced by the counter, for producing a pulse in response to each leading and trailing edge of the speed control signal and pulses from the counter, the pulses from the pulse circuit being applied to the memory as an address signal.

12. A motor control in accordance with claim 11 further comprising:
a frequency multiplier, coupled to a rotor position sensor, for producing a control signal having a frequency which is a multiple of the frequency of the speed control signal, the control signal being coupled to the counter for controlling the frequency of the pulses of variable duration produced by the counter.

13. A motor control in accordance with claim 12 wherein:
the frequency of the control signal is variable.

14. A motor control in accordance with claim 13 wherein:
the frequency of the control signal is selectable in multiples of the speed control signal.

15. A motor control in accordance with claim 14 wherein the source of the variable frequency speed control signal comprises:

a rotor position signal produced by the rotor position sensor in response to rotation of the rotor;

a variable frequency voltage source; and means, coupled to the rotor position signal the variable frequency voltage source, for selectively outputting the speed control signal from the rotor position sensor or the variable frequency voltage source.

16. A motor control in accordance with claim 12 further comprising:

an amplifier having an input and an output coupled to the voltage controlled oscillator;

a first current path, coupling an output from the net DC current sensing means to the input of the amplifier, with a first switch contained in the first current path for controlling the flow of current in the first current path, the first switch having a conductivity controlled by the speed control signal with a first level of the speed control signal causing the first switch to be conductive to permit current to flow in the first current path and a second level of the speed control signal causing the first switch to be non-conductive to block current flow in the first current path; and a second current path, coupling an inverted output from the net DC current sensing means to the input of the amplifier, with a second switch contained in the second current path for controlling the flow of current in the second current path, the second switch having a conductivity controlled by the speed control signal with the first level of the speed control signal causing the second switch to be non-conductive to block current flow in the second current path, and the second level of the speed control signal causing the second switch to be conductive to permit current to flow in the second current path, the speed control signal cyclically varying between the first and second levels.

17. A motor control in accordance with claim 15 further comprising:

an amplifier having an input and an output coupled to the voltage controlled oscillator;

a first current path, coupling an output from the net DC current sensing means to the input of the amplifier, with a first switch contained in the first current path for controlling the flow of current in the first current path, the first switch having a conductivity controlled by the speed control signal with a first level of the speed control signal causing the first switch to be conductive to permit current to flow in the first current path and a second level of the speed control signal causing the first switch to be non-conductive to block current flow in the first current path; and a second current path, coupling an inverted output from the net DC current sensing means to the input of the amplifier, with a second switch contained in the second current path for controlling the flow of current in the second current path, the second switch having a conductivity controlled by the speed control signal with the first level of the speed control signal causing the second switch to be non-conductive to block current flow in the second current path, and the second level of the speed control signal causing the second switch to be conductive to permit current to flow in the second current path, the speed control signal cyclically varying between the first and second levels.

18. A method of controlling an electric motor powered by an AC pulse source which applies current pulses to stator windings of the motor to cause rotation of a rotor comprising:

sensing a net DC current in the current pulses over a period of time flowing to the stator windings during rotation of the motor and producing a negative feedback signal which is a function of the sensed net DC current; and varying pulse width modulation of the current pulses in response to the negative feedback signal to reduce the net DC current toward zero during rotation of the motor.

* * * * *